(12) United States Patent
Welder

(10) Patent No.: US 6,473,855 B1
(45) Date of Patent: Oct. 29, 2002

(54) METHOD AND APPARATUS FOR PROVIDING CONTENT ON A COMPUTER SYSTEM BASED ON USAGE PROFILE

(75) Inventor: W. Dean Welder, Boulder Creek, CA (US)

(73) Assignee: Phoenix Technologies Ltd., San Jose, CA (US)

(*) Notice: Subject to any disclaimer, the term of this patent is extended or adjusted under 35 U.S.C. 154(b) by 0 days.

(21) Appl. No.: 09/336,111

(22) Filed: Jun. 18, 1999

(51) Int. Cl.[7] .......................... G06F 13/14; G06F 13/20; G06F 1/04

(52) U.S. Cl. .............................. 713/2; 710/29; 710/33; 710/34; 713/502

(58) Field of Search ............................ 710/33, 29, 34; 713/2, 502

(56) References Cited

U.S. PATENT DOCUMENTS

| | | |
|---|---|---|
| 5,121,345 A | 6/1992 | Lentz |
| 5,128,995 A | 7/1992 | Arnold et al. |
| 5,131,089 A | 7/1992 | Cole |
| 5,142,680 A | 8/1992 | Ottman et al. |
| 5,146,568 A | 9/1992 | Flaherty et al. |
| 5,212,798 A * | 5/1993 | Kanda .................. 395/775 |
| 5,214,695 A | 5/1993 | Arnold et al. |
| 5,274,816 A | 12/1993 | Oka |
| 5,280,627 A | 1/1994 | Flaherty et al. |
| 5,307,497 A | 4/1994 | Feigenbaum et al. |
| 5,325,532 A | 6/1994 | Crosswy et al. |
| 5,379,431 A | 1/1995 | Lemon et al. |
| 5,381,549 A | 1/1995 | Tamura |
| 5,418,918 A | 5/1995 | Vander Kamp et al. |
| 5,444,850 A | 8/1995 | Chang |
| 5,448,741 A | 9/1995 | Oka |
| 5,452,454 A | 9/1995 | Basu |
| 5,463,766 A | 10/1995 | Schieve et al. |

(List continued on next page.)

*Primary Examiner*—Jeffrey Gaffin
*Assistant Examiner*—Rehana Penveen

(57) ABSTRACT

A method and apparatus for determining a computer system usage profile, and transmitting the computer system usage profile to a server which targets content to the computer system in response to the usage profile is described. A basic input output system (BIOS) module and/or an operating system module obtain computer system usage profile information by tracking events such as the frequency of re-boots, the time required to boot-up and shut-down the operating system on the computer system, the amount of time the computer system is "used", and the frequency and amount of time the computer system is connected to the Internet. This data is collected and communicated to a profile server. The profile server targets content such as messages with graphics or informational material, etc. to the computer system based upon the computer system usage profile. In one embodiment, the content is displayed during boot-up and shut-down of the operating system.

17 Claims, 10 Drawing Sheets

U.S. PATENT DOCUMENTS

| | | | |
|---|---|---|---|
| 5,469,573 A | 11/1995 | McGill, III et al. | |
| 5,504,905 A | 4/1996 | Cleary et al. | |
| 5,522,076 A | 5/1996 | Dewa et al. | |
| 5,526,523 A | 6/1996 | Straub et al. | |
| 5,542,082 A | 7/1996 | Solhjell | |
| 5,581,740 A | 12/1996 | Jones | |
| 5,586,327 A | 12/1996 | Bealkowski et al. | |
| 5,594,903 A | 1/1997 | Bunnell et al. | |
| 5,604,890 A | 2/1997 | Miller | |
| 5,652,868 A | 7/1997 | Williams | |
| 5,652,886 A | 7/1997 | Tulpule et al. | |
| 5,664,194 A | 9/1997 | Paulsen | |
| 5,680,547 A | 10/1997 | Chang | |
| 5,692,190 A | 11/1997 | Williams | |
| 5,694,583 A | 12/1997 | Williams et al. | |
| 5,694,600 A | 12/1997 | Khenson et al. | |
| 5,701,477 A | 12/1997 | Chejlava, Jr. | |
| 5,715,456 A | 2/1998 | Bennett et al. | |
| 5,717,930 A | 2/1998 | Imai et al. | |
| 5,727,213 A | 3/1998 | Vander Kamp et al. | |
| 5,732,268 A | 3/1998 | Bizzarri | |
| 5,748,957 A | 5/1998 | Klein | |
| 5,754,853 A | 5/1998 | Pearce | |
| 5,764,593 A | 6/1998 | Turpin et al. | |
| 5,768,627 A * | 6/1998 | Jones et al. | 395/880 |
| 5,781,758 A | 7/1998 | Morley | |
| 5,790,849 A | 8/1998 | Crocker et al. | |
| 5,796,984 A | 8/1998 | Pearce et al. | |
| 5,802,363 A | 9/1998 | Williams et al. | |
| 5,805,880 A | 9/1998 | Pearce et al. | |
| 5,805,882 A | 9/1998 | Cooper et al. | |
| 5,815,706 A | 9/1998 | Stewart et al. | |
| 5,819,063 A | 10/1998 | Dahl et al. | |
| 5,828,888 A | 10/1998 | Kozaki et al. | |
| 5,832,251 A | 11/1998 | Takahashi | |
| 5,842,011 A | 11/1998 | Basu | |
| 5,854,905 A | 12/1998 | Garney | |
| 5,864,698 A | 1/1999 | Krau et al. | |
| 5,887,164 A | 3/1999 | Gupta | |
| 5,901,310 A | 5/1999 | Rahman et al. | |
| 5,907,679 A | 5/1999 | Hoang et al. | |
| 5,920,896 A * | 7/1999 | Grimsrud et al. | 711/165 |
| 6,138,234 A * | 10/2000 | Lee et al. | 713/2 |
| 6,202,190 B1 * | 3/2001 | Rogier | 714/815 |

\* cited by examiner

METHOD AND APPARATUS FOR PROVIDING CONTENT ON A COMPUTER SYSTEM BASED ON USAGE PROFILE

BACKGROUND OF THE INVENTION

1. Field of the Invention

The present invention relates generally to the field of computer systems, and specifically, to a method and apparatus for determining computer system usage profile information.

2. Background Information

In a typical computer, such as a PC-compatible computer, the boot process involves performing various system tests and displaying a basic input-output system (BIOS) information screen. This time period is referred to as power on self test (POST). Once the BIOS completes the POST, it loads a native operating system. The operating system then replaces the BIOS information screen with the operating system's own display screen. The operating system, such as for example, the Windows™ operating system, displays its own proprietary splash or "cloud screen" while the operating system is loading. The display screen shows a static, graphical company logo and product image with an activity indicator. The activity indicator generally shows activity near the bottom of the screen either using color manipulation or presenting a progress bar with color filling to indicate the current progress of the operating system loading.

During the time the operating system is loading, there is no informational content displayed on the screen for the user. Moreover, the time spent loading the operating system is significantly longer then the POST of the BIOS. Consequently, a much shorter duration of time is given to the user to view and read the contents of the BIOS information screen display or other content for viewing by users.

During the time the operating system is loading and/or shutting down, content such as messages with graphics or informational material can be displayed on the display screen for the user. The longer the operating system takes to load and/or shut down, the more content can be displayed on the display screen.

SUMMARY OF THE INVENTION

The present invention is a method of determining boot-up time of a computer system. In one embodiment, the method includes retrieving a first time on the computer system, loading the operating system, retrieving a second time on the computer system when the operating system has loaded, and determining a boot time in response to the first and second times.

Other embodiments are described and claimed herein.

DETAILED DESCRIPTION

Figure 1:
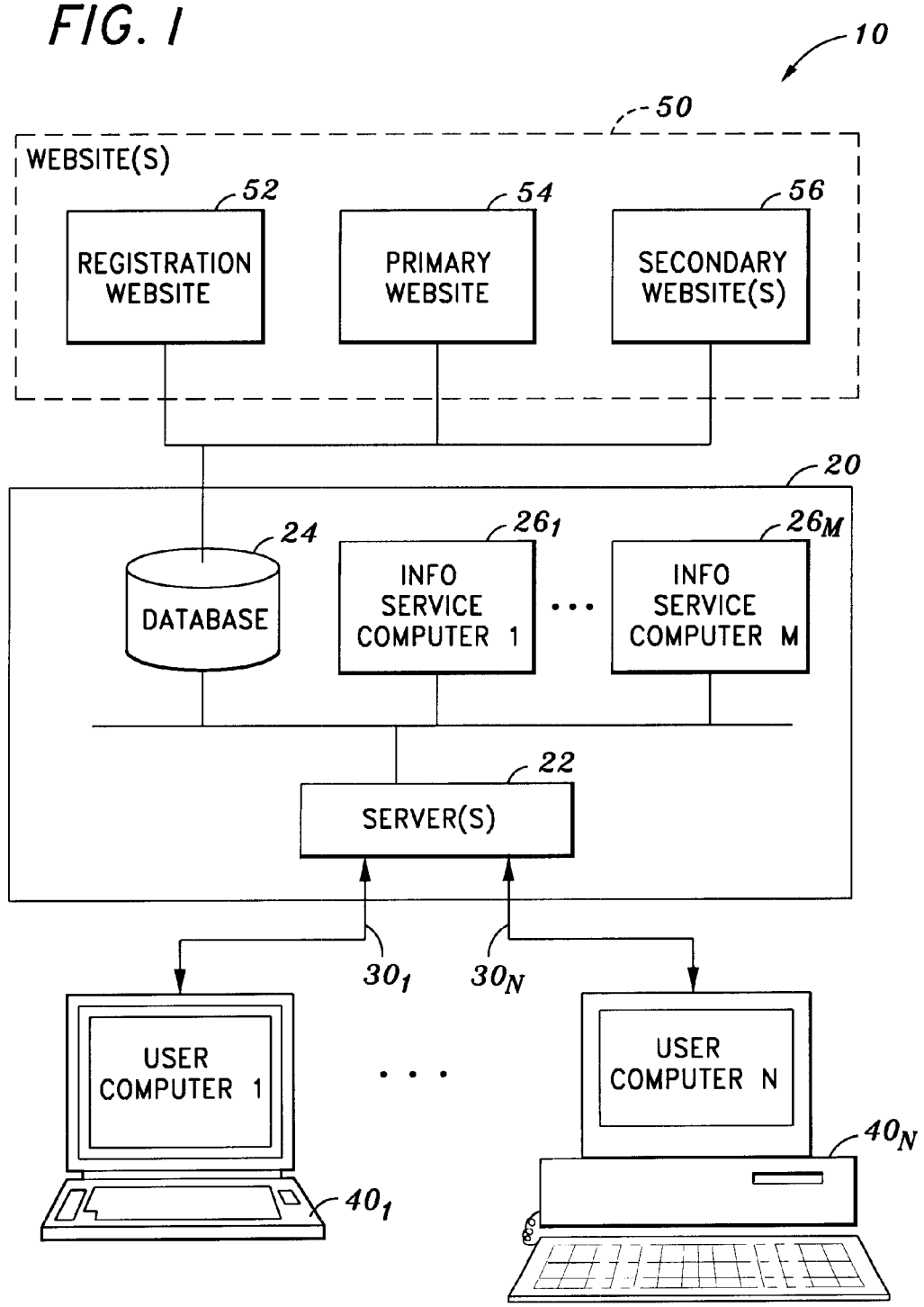
FIG. 1 is a system block diagram of one embodiment of an information distribution system in which the apparatus and method of the invention is used.

The present invention comprises a method and apparatus for determining computer system usage profile on a computer system, and transmitting the computer system usage profile to a server which targets content to the computer system in response to the usage profile. The present invention includes a basic input output system (BIOS) module and/or an operating system module which obtain computer system usage profile information. The modules track items such as the frequency of re-boots, the time required to boot and shut-down the operating system on the computer system, the amount of time the computer system is "used", and the frequency and amount of time the computer system is connected to a network (e.g., the Internet). This data is collected and communicated to a profile server. The profile server targets content such as messages with graphics or informational material, etc. to the computer system based upon the usage profile. In one embodiment, the content is displayed during the time the operating system is loading and/or shutting down.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking. equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/ or run applications. Power On Self Test (POST) refers to the instructions that are executed to configure and test the system hardware prior to loading an OS.

System Overview

A description of an exemplary system, which incorporates embodiments of the present invention, is hereinafter described.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, messages with graphics or informational material, animation, Joint Photographic Experts Group (JPEG)/Moving Picture Experts Group (MPEG) formatted material on the screen. When additional programs and/or payloads are delivered. (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289 entitled "Method and Apparatus for Automatically Installing And Configuring Software on a Computer" incorporated herein by reference, the first software. module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1 26_M$. The one or more computers $26_1$–$26_M$ are capable of simultaneous access by a plurality of the user computer systems $40_1$–$4_N$. If a plurality of computers are used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/ or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
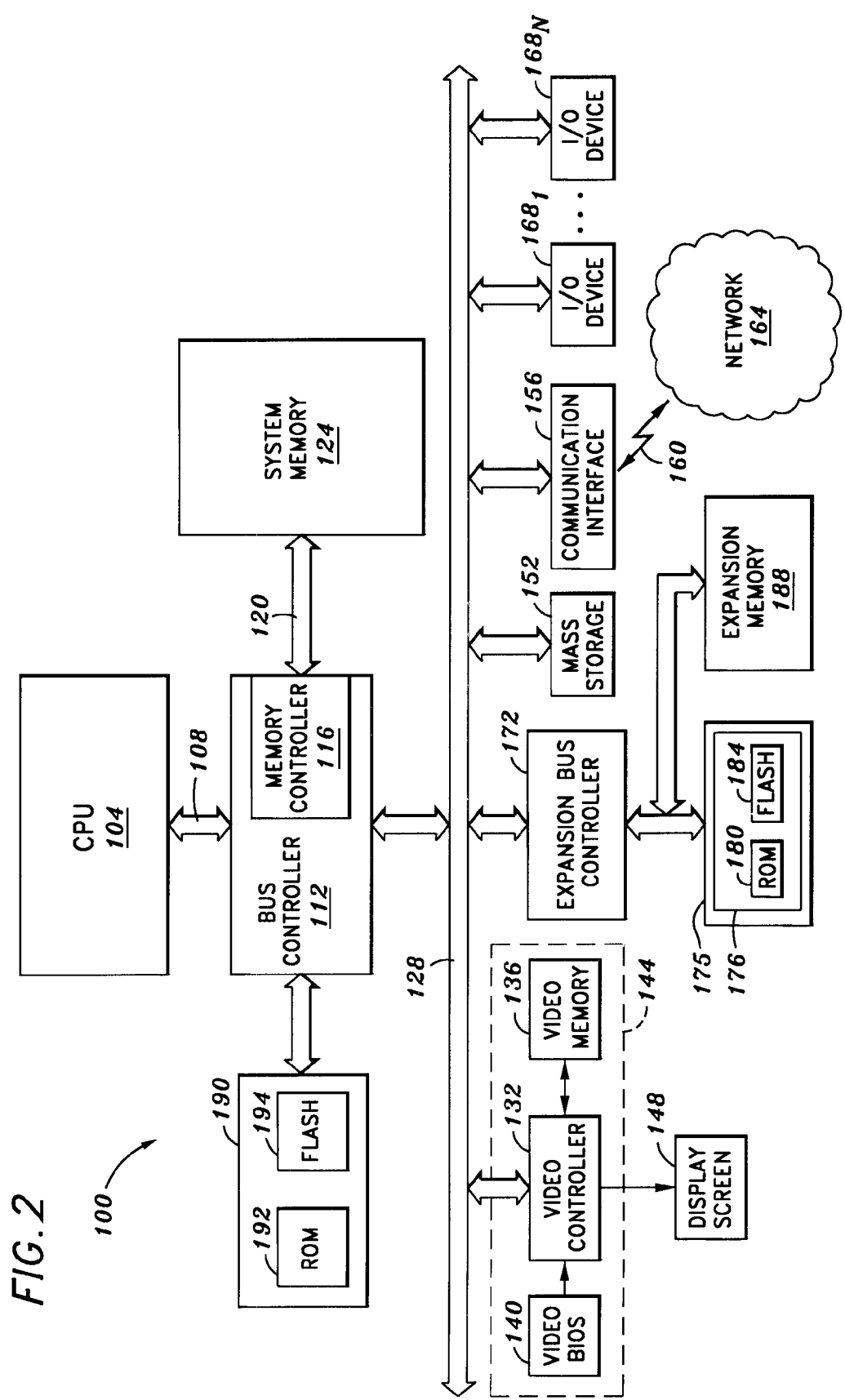
FIG. 2 illustrates an exemplary processor system or user computer system which implements embodiments of the present invention.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6×86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capacity media device, and/or any combination thereof. The expansion bus controller 172 is coupled to non-volatile memory 175 which includes system firmware 176. The system firmware 176 includes system BIOS (numeral 82, FIG. 3), which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computerexecuted. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 3:
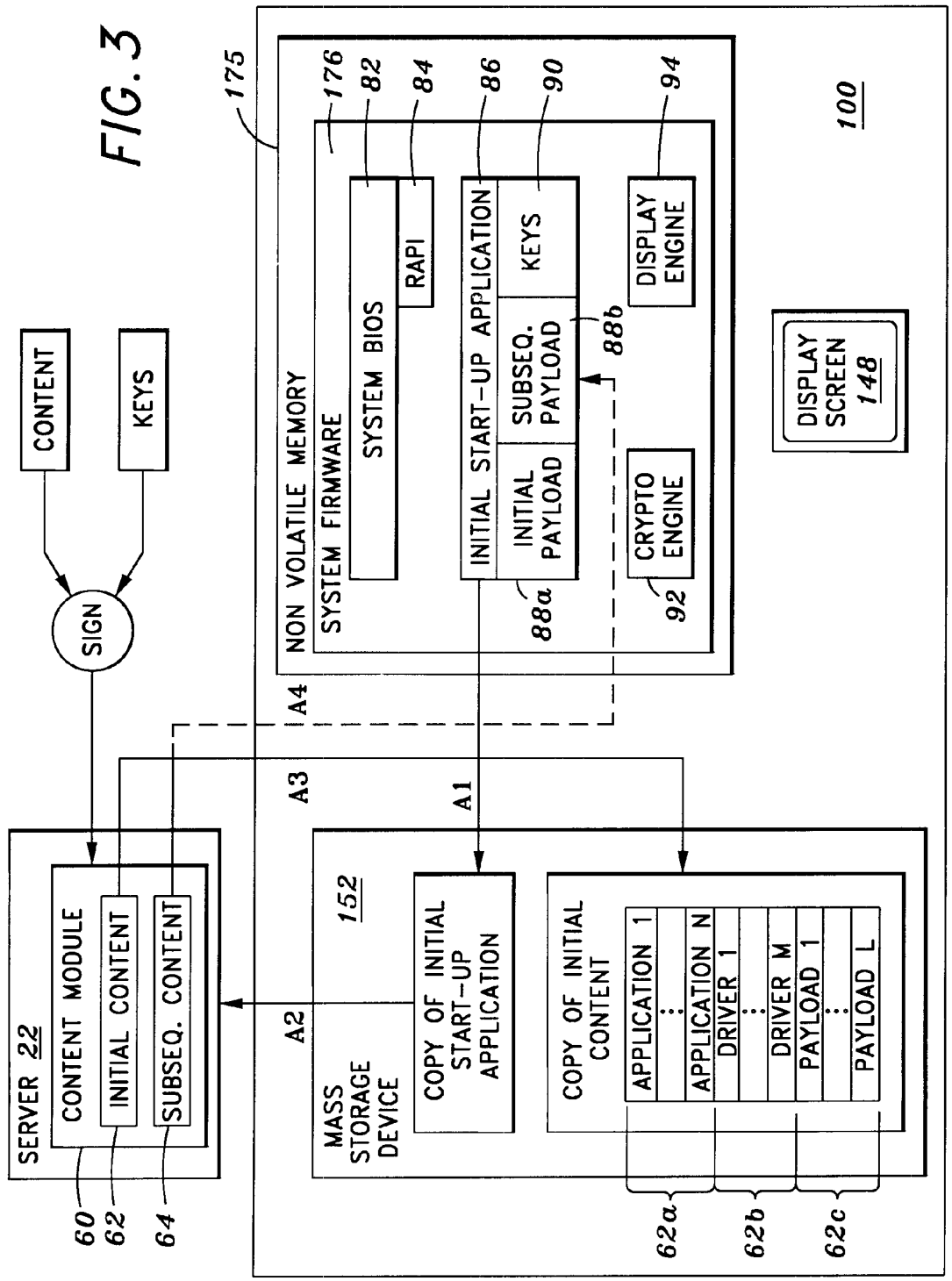
FIG. 3 illustrates a logical diagram of one embodiment of the invention.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88a, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. RAPI 84 provides a secure interface between ROM application programs and system BIOS 82. The RAPI 84, ISUA 86, and initial payload 88a may each be separately developed and stored in the system firmware 176 prior to initial use of the computer system 100. In one embodiment, the RAPI 84, ISUA 86, and initial payload 88a each includes proprietary software developed by Phoenix Technologies, Ltd. One embodiment of RAPI.84 is described in copending U.S. patent application Ser. No. 09/336,889 entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,289 entitled "Method and Apparatus for Automatically Installing and Configuring Software on a Computer," filed on Jun. 18, 1999, assigned to Phoenix Technologies, Ltd., and which is incorporated herein by reference.

Figure 4A:
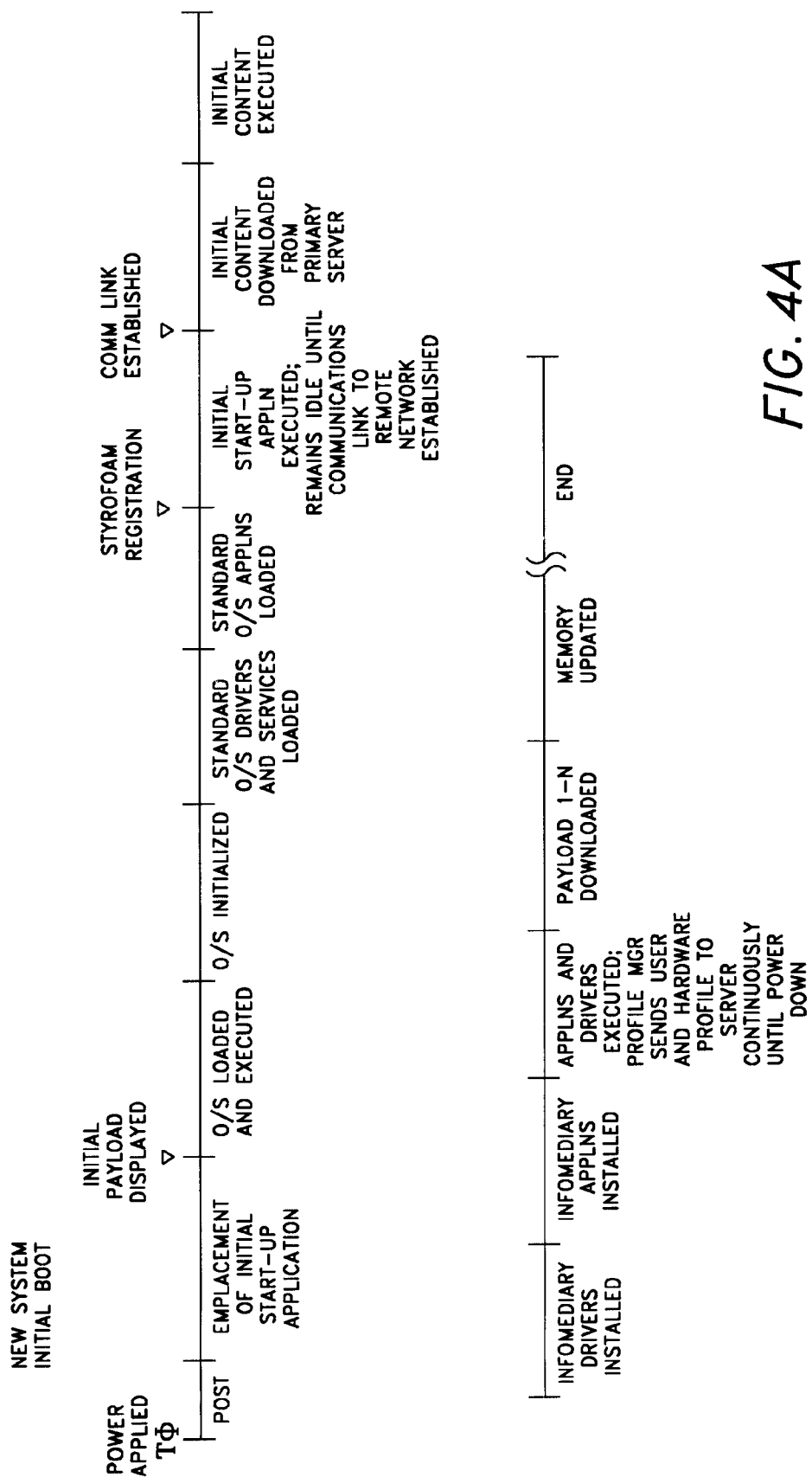
FIGS. 4A and 4B illustrate one embodiment of a process flow chart provided in accordance with the principles of the invention.
Figure 4B:
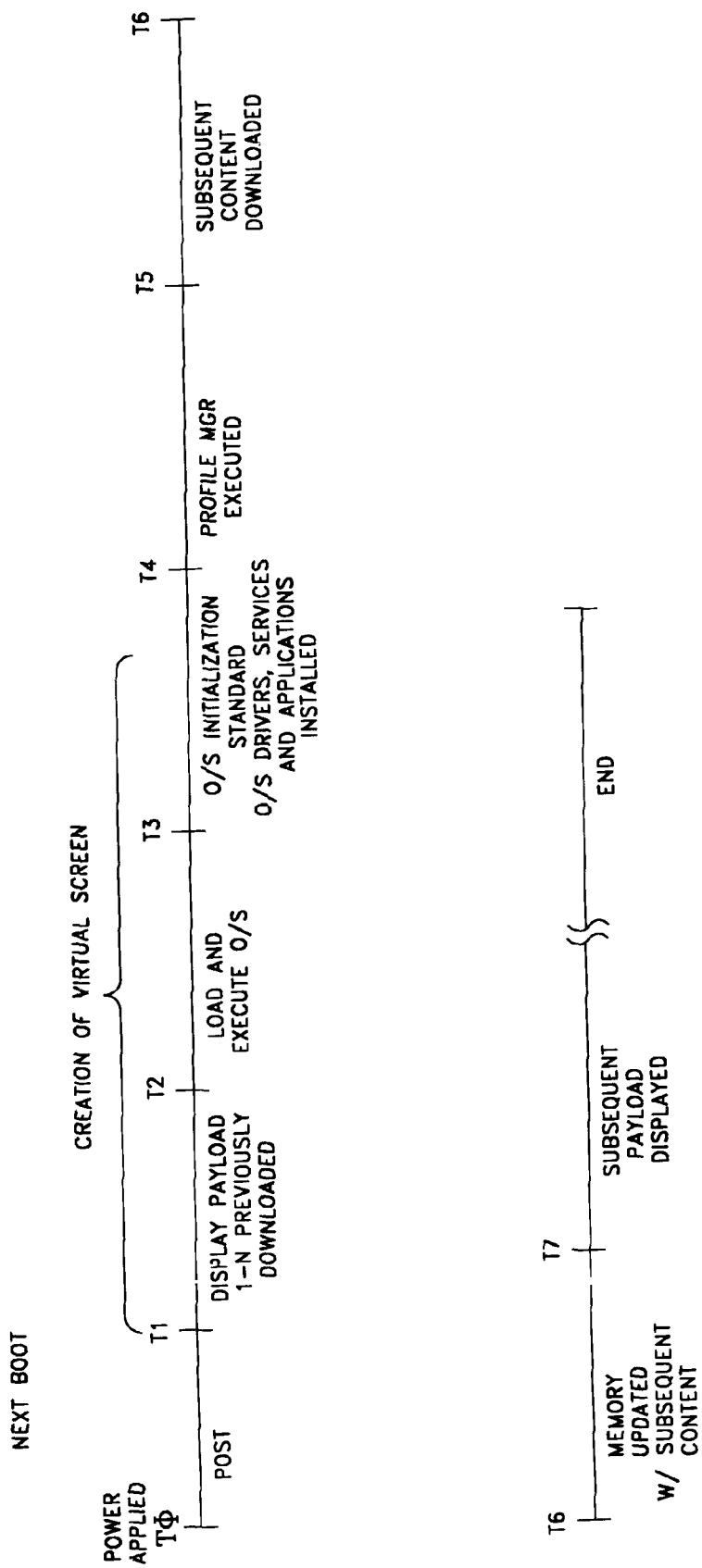

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067 entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. Patent Continuation-in-Part application Ser. No. 09/336,307 entitled "Method and Apparatus for Providing Memory-Based Device Emulation" filed on Jun. 18, 1999, and in co-pending U.S. patent application Ser. No. 09/336,281 entitled "System and Method for Inserting One or More Files Onto Mass Storage" filed Jun. 18,1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/ or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62a, drivers 62b, and payloads 62c. In one embodiment, the applications 62a include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users which have similar profiles. In addition, the user profile data of a plurality of users are compiled on the server 22 and aggregated to create an aggregate user profile model. Content is then transmitted to user computer system's based on the user profile data and/or the aggregate user profile model (as shown-by A4). The subsequent content 64 is downloaded and stored in system firmware 176, designated by numeral 88b. In one embodiment, the subsequent content 64 is stored in non-volatile memory such as flash or EEPROM, with the loading of the subsequent content being done by refashion the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., graphic file), as described in co-pending U.S. patent application Ser. No. 09/336,003 entitled "Displaying Images during Boot-up and Shut-down" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may bemused to provide icons or shortcuts that are used to access detailed information regarding the previously displayed messages with graphics or informational material. In a further embodiment, the messages with graphics or informational material may again be displayed during the shut-down process, for example, replacing the screen display that displays the message "Windows is shutting down" or "It is now safe to turn off your computer" with other selected content.

1. Boot Frequency

Figure 5:
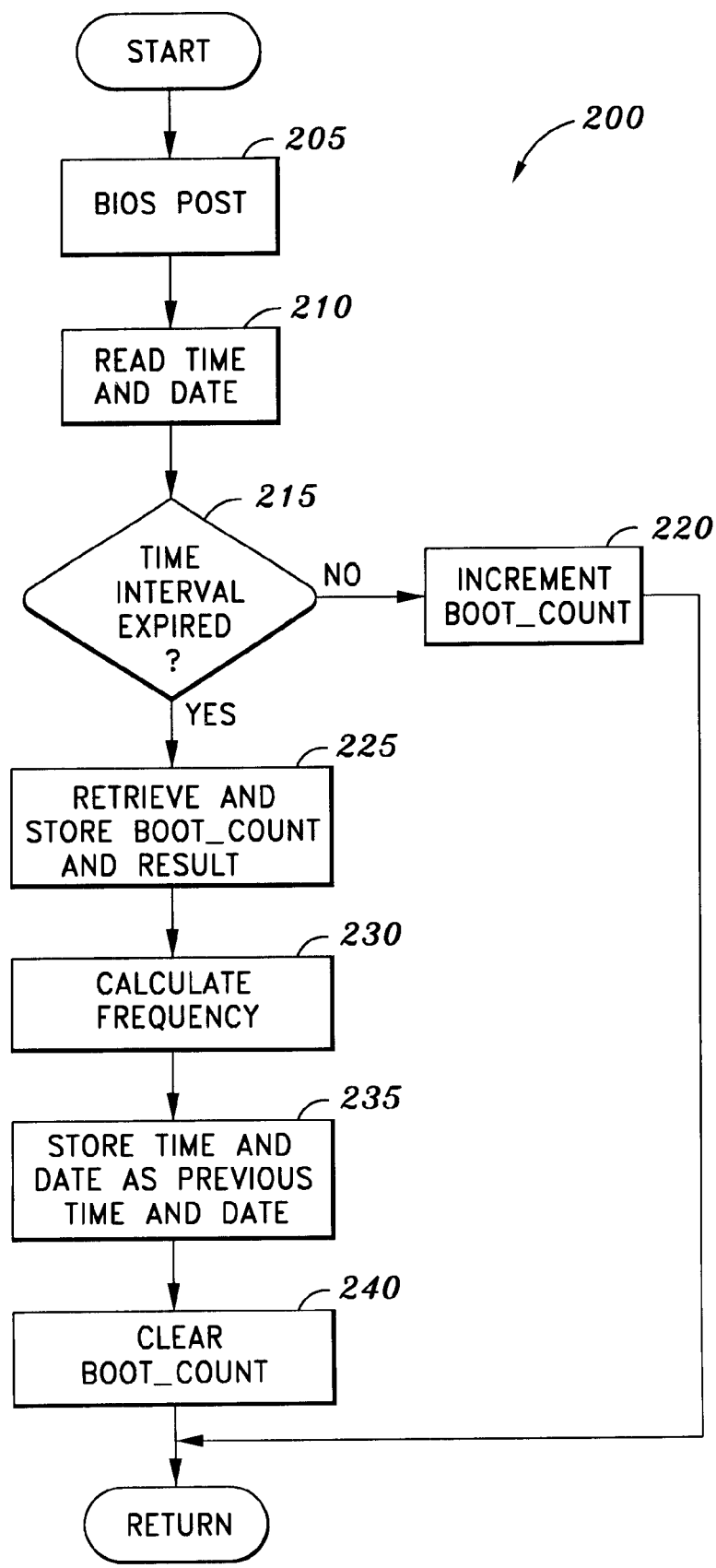
FIG. 5 shows an exemplary flow diagram of a portion of a BIOS profile module, according to one embodiment of the present invention.

FIG. 5 shows an exemplary flow diagram of a portion of a BIOS profile module 200, according to one embodiment of the present invention. The BIOS profile module 200 is part of the system BIOS 82 (FIG. 2), or is an add-on to BIOS 82. Initially when the computer system 100 (FIG. 2) is first powered on, the BIOS profile module 200 sets up a BOOT_COUNT and initializes it to zero, either on mass storage 152 or flash memory 184 (e.g., some form of non-volatile storage). The BOOT_COUNT tracks the number of system boots either as a raw number or on a frequency basis (e.g., monthly, weekly, etc.). The BIOS profile module 200 is executed at some point during BIOS POST, as shown by block 205. In one embodiment, the BIOS profile module 200 is executed at the end of BIOS POST, just before the operating system is launched.

Referring to FIG. 5, the module 200 retrieves the system time and date (block 210), which is read from the system clock/timer chip. At block 215, it is determined whether a predetermined time interval has expired. This involves reading a previous time and date, subtracting the current time and date from the previous time and date to provide a result, and comparing the result with the predetermined time interval (e.g., yearly, monthly, weekly, daily, etc.). The previous time and date and predetermined time interval are stored in non-volatile memory. Initially, when the computer system 100 is first powered up, an initial previous time and date are stored. If the time interval has not expired, then BOOT_COUNT is incremented (block 220) and module 200 ends.

However, if the time interval has expired, then BOOT_COUNT and result are stored in a separate non-volatile memory location (block 225) for later transmission to, for example, profile server 22 (FIG. 1). In addition, a frequency based on the BOOT_COUNT and result is calculated (block 230) indicating an average of how often the computer system 100 is booted. The frequency is stored with BOOT_COUNT and result, as a single record. A number of such records are created over time, and the one or more records are transmitted to profile server 22 periodically. The one or more records are then cleared. Continuing to refer to FIG. 5, the current time and date are stored as the previous time and date (block 235), BOOT_COUNT is cleared (block 240), and the module 200 ends.

The boot frequency is used by the profile server 22 to determining how often the user is on the computer system 100, and hence the effectiveness -of content delivered to the computer system 100. In addition, the boot frequency is a factor in determining the periodicity for delivering content to computer system 100.

2. Boot Duration

Figure 6:
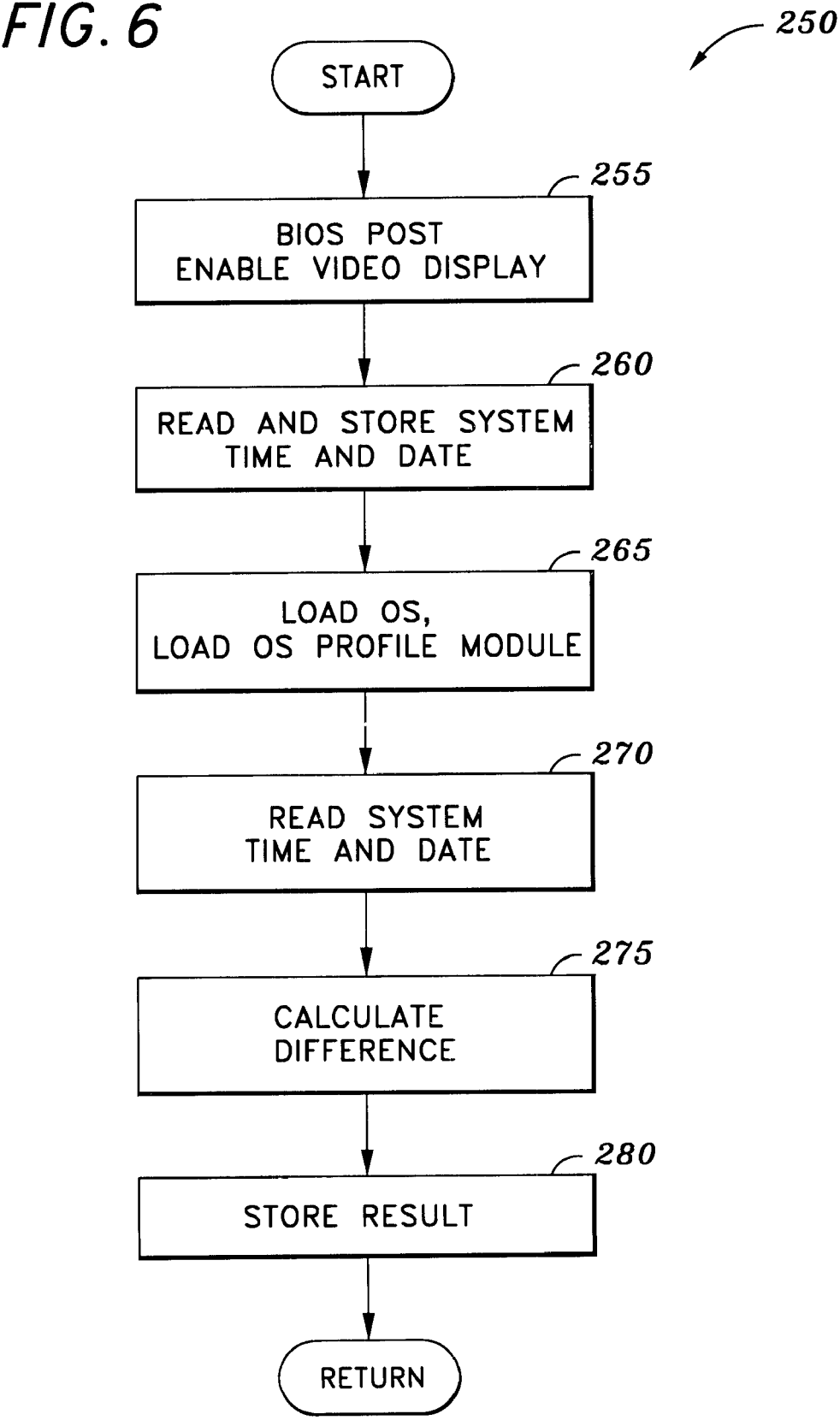
FIG. 6 shows a flow diagram showing a process for determining boot duration, according to one embodiment of the present invention.

FIG. 6 shows a flow diagram showing a process 250 for determining boot duration, according to one embodiment of the present invention. Referring to FIG. 6, the process 250 commences during BIOS POST by, for example, the system BIOS 82 (FIG. 2). Immediately after enabling the video display during BIOS POST (block 255), the system time and date are read and stored in a temporary location (e.g., system memory 124, mass storage 152, etc. of FIG. 2), as shown in block 260. Reading the system time and date generally involves reading an I/O address where the system timer registers reside.

At the end of BIOS POST, the operating system is loaded, and, at the end of the loading of the operating system, an OS profile module is loaded (block 265). In one embodiment, the OS profile module is one of the application programs 62a or drivers 62b shown in FIG. 3, and is loaded at startup of the operating system. Once the OS profile module is loaded, it is assumed that the operating system or user desktop is available. Once loaded, the OS profile module reads the system time and date (block 270). The OS profile module then subtracts the first time and date located in the temporary location from the second time and date (block 275). The result is the boot duration, i.e., the time that it takes to load the operating system. The boot duration is then stored as a record in non-volatile memory (e.g., mass storage 152, flash 184, etc.), as shown in block 280.

In one embodiment, each time the computer system 100 is booted, the boot duration is stored as a record. Alternatively, the boot duration is calculated and stored periodically (e.g., every week, month, etc.). It is important to calculate the boot duration each time or periodically because the boot duration may vary from one boot to another. This could be attributed to a number of factors, including, for example, the changing of machine settings (e.g., adding or removing hardware such as DVD-ROM drive), memory chip problems during BIOS POST which causes a change in the amount of detected memory, power fluctuations which cause hard disk spin up times to vary, and the like.

The one or more records collected are periodically transmitted to profile server 22 (FIG. 1). The boot duration indicates to the profile server 22 the amount of time available for content to be displayed. The more time content is displayed for end users, the more the originators of the content can be charged for displaying such content. A similar process can be used to determine the shut-down time.

3. Internet Connection Frequency

Figure 7:
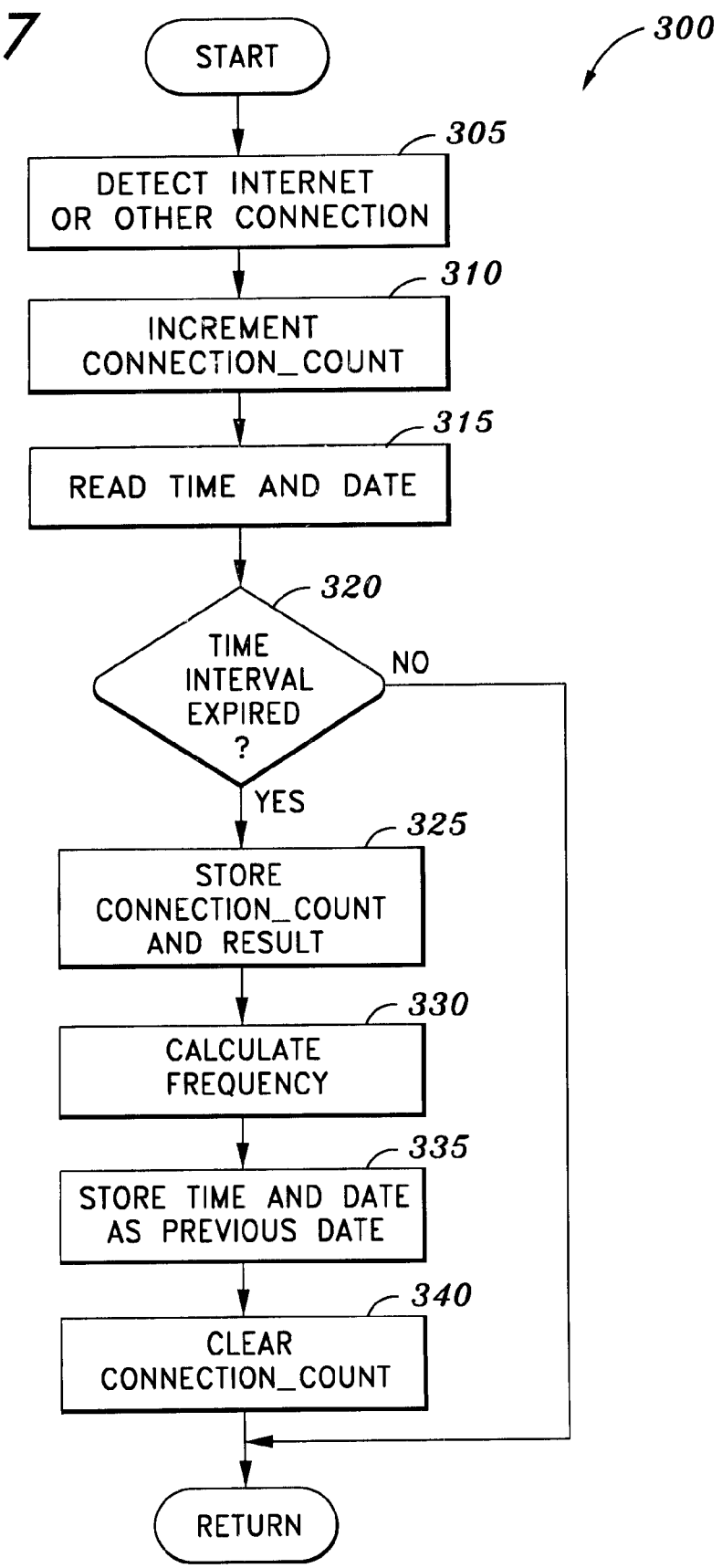
FIG. 7 shows an exemplary flow diagram of a portion of the OS profile module, according to one embodiment of the present invention.

FIG. 7 shows an exemplary flow diagram of a portion of the OS profile module 300, according to one embodiment of the present invention. In one embodiment, the OS profile module 300 is an application program 62a or driver 62b stored on mass storage 152 (FIG. 3). Initially when the OS profile module 300 is first executed, the OS profile module 300 sets up a CONNECTION_COUNT and initializes it to zero, either on mass storage 152 or flash memory 184 of FIG. 2 (e.g., some form of non-volatile storage). The CONNECTION_COUNT tracks the number of connections to the Internet or other network either as a raw number or on a frequency basis (e.g., monthly, weekly, etc.). The OS module 300 watches for an Internet connection while running in the background. For a description of embodiments showing how the Internet connection detection operates, see co-pending U.S. patent application Ser. Nos. 09/336,108 and 09/336,289 entitled "Method and Apparatus for Creating and Deploying Smaller Microsoft Windows Applications for Automatic Configuration of a Computing Device" and "Method and Apparatus for Automatically Installing and Configuring Software on a Computer", filed concurrently herewith and assigned to Phoenix Technologies Ltd., the assignee of the present invention, the contents of which are herein incorporated by reference. When a connection is detected (block 305), the module 300 increments CONNECTION_COUNT (block 310) and stores it back to memory.

At block 315,. the module 300 retrieves the current system time and date, which are read from the system clock/timer chip. At block 320, it is determined whether a predetermined time interval has expired. This involves reading a previous time and date, subtracting the current time and date from the previous time and date to provide a result, and comparing the result with a predetermined time interval (e.g., yearly, monthly, weekly, daily, etc.). The previous time and date and predetermined time interval are stored in non-volatile memory. Initially, when the OS profile module 300 is first powered up, an initial previous time and date is stored. If the time interval has not expired, then the module ends.

However, if the time interval has expired, CONNECTION_COUNT and result are stored in a separate non-volatile memory location (block 325) for later transmission to, for example, profile server 22 (FIG. 1). In addition, a frequency, based on the CONNECTION_COUNT and result, is calculated (block 330) indicating an average of how often there is an Internet connection. The frequency is stored with CONNECTION_COUNT and result, as a single record. A number of such records are created over time, and are transmitted to profile server 22 periodically. The one or more records are then cleared. The current time and date are stored as the previous time and date (block 335), CONNECTION_COUNT is cleared (block 340), and the module 300 ends.

The connection frequency is used by the profile server 22 to determining how often the user is connected to the Internet, and hence the amount of and periodicity of content that can be downloaded to computer system 100.

4. Internet Connection Duration

Figure 8:
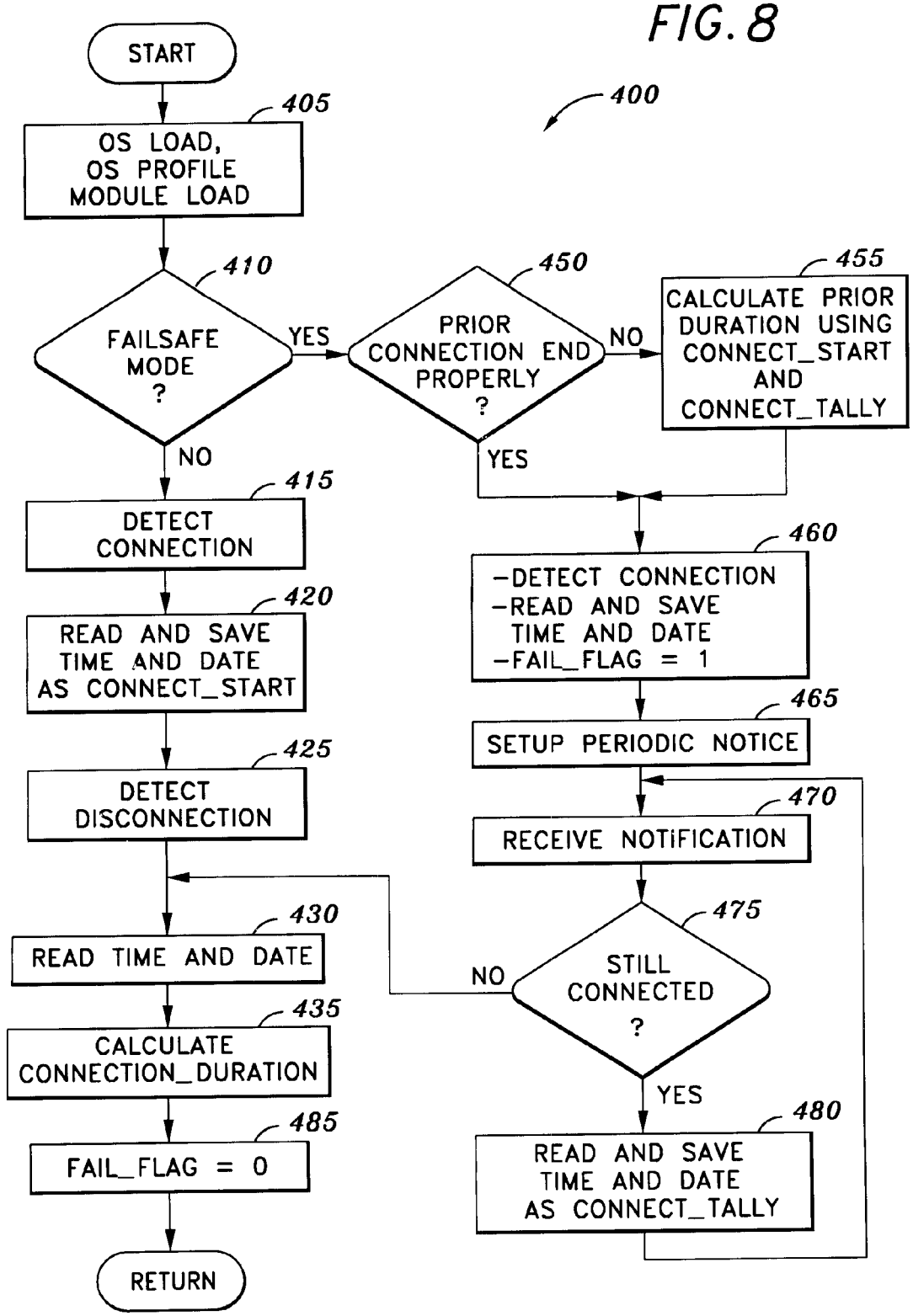
FIG. 8 shows an exemplary flow diagram of another portion of the OS profile module, according to one embodiment of the present invention

FIG. 8 shows an exemplary flow diagram of another portion of the OS profile module 400, according to one embodiment of the present invention. Referring to FIG. 8, the OS profile module 400 is loaded after the operating system is loaded (block 405). The OS profile module 400 then determines whether it is in a failsafe mode by interrogating a failsafe flag. The failsafe flag, which is optionally user alterable, is stored in non-volatile memory or is hard-coded as part of the module 400. In the case where failsafe mode is not used, the OS profile module 400 continuously monitors for an Internet connection while running in the background (block 415). When a connection is detected, the OS profile module 400 reads the system time and date, and stores the same in non-volatile memory as connection start_time. In the Windows™ environment, the module 400 uses operating system call GetSystemTime( ) to retrieve the system time and date.

When the computer system 100 (FIG. 2) is disconnected from the Internet, the module 400 detects the disconnection (block 425), retrieves the time and date (e.g., using the GetSystemTime( ) call), as shown in block 430, and temporarily saves the same (e.g., in RAM) as connection end_time. The connection start_time is subtracted from the connection end_time to determine a connection_duration (block 435). The connection duration is stored in a record in non-volatile memory-for later delivery to the profile server 22 (FIG. 1). At block 485, a FAIL_FLAG is reset to zero (used in failsafe mode), and is described in the following paragraphs.

In an alternative implementation, the failsafe mode is utilized. The failsafe mode takes into account the fact that the computer system 100 may shut-off abruptly, and recovers in a well-behaved manner. In the failsafe mode, the OS profile module 400 utilizes an operating system SetTimer( ) service to get a periodic signal from the operating system. When the module 400 receives the signal from the operating system, the module verifies that the computer system 100 is still connected, and, if so, retrieves the time and date using GetSystemTime( ) and stores the time and date in non-volatile memory as connection tally time. This helps overcome situations where the computer system 100 loses power or is powered off without first disconnecting from the Internet.

Continuing to refer to FIG. 8, the OS profile module 400 determines whether the prior connection ended properly (block 450). This is accomplished by using a FAIL_FLAG that is stored in non-volatile memory. When the module 400 is started for the first time, FAIL_FLAG is set to zero. If FAIL_FLAG is modified to one and is not cleared, indicating that the prior connection did not end properly, the connection_duration is calculated using connection start_time and connection tally-time stored in non-volatile memory. The connection duration is then stored in non-volatile memory (block 455). On the other hand, if FAIL_FLAG is equal to zero, then the module 400 moves to block 460. At block 460, the module 400 again waits for an Internet connection. Once an Internet connection is detected, the time and date are retrieved and saved as connection start-time, and FAIL_FLAG is set to one. At block 465, the periodic notification is setup using the operating system SetTimer( ) service. At block 470, a notification is received, and at block 475 it is determined whether there is still an Internet connection. If there is an Internet connection, the time and date are retrieved and saved as connection tally_time in non-volatile memory (block 480). Blocks 470, 475, and 480 are continuously executed until there is no longer an Internet connection, at which time blocks 430, 435, and 485 are executed as before, and the module ends.

The connection duration together with the connection frequency provide the profile server 22 with the ability to determining how often and for how long the user is connected to the Internet or other network.

5. System Usage Duration

Figure 9:
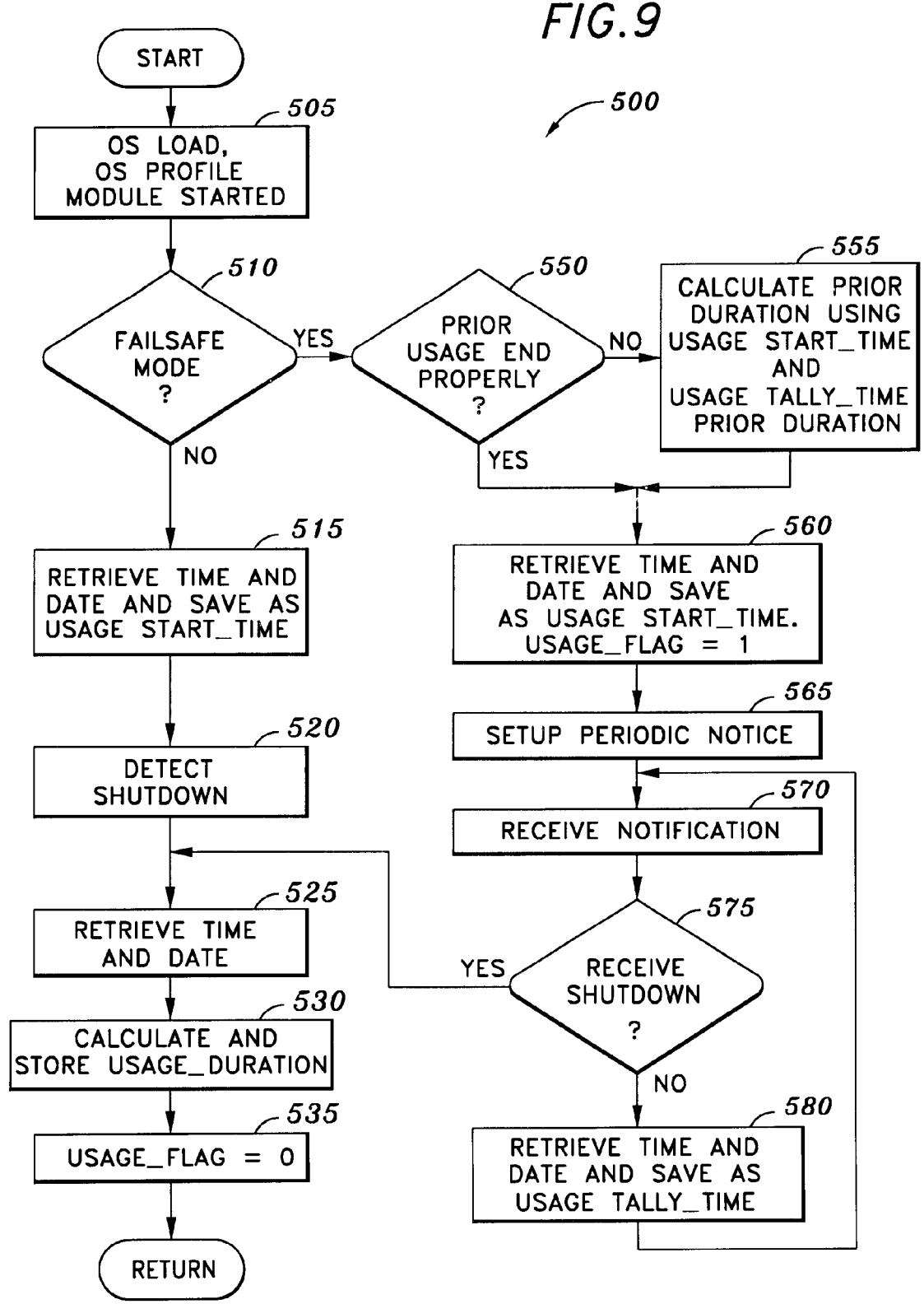
FIG. 9 shows an exemplary flow diagram of yet another portion of the OS profile module, according to one embodiment of the present invention

FIG. 9 shows an exemplary flow diagram of yet another portion of the OS profile module 500, according to one embodiment of the present invention. Referring to FIG. 9, the OS profile module 500 is loaded after the operating system is loaded (block 505). The OS profile module 500 then determines whether it is in the failsafe mode. If failsafe mode is not used, the OS profile module 500 retrieves the system time and date (e.g., using the GetSystemTime( ) call) and saves the same as usage start_time in non-volatile memory (block 515). When a shutdown of computer system 100 (FIG. 2) is detected (block 520), the module 500 retrieves the time and date again (block 525), and temporarily saves the same as usage end_time. The usage start_time is subtracted from the usage end_time to determine the usage-duration (block 530). The usage duration is stored in a record in non-volatile memory for later delivery to the profile server 22 (FIG. 1). At block 535, a USAGE_FLAG is reset to zero (used in failsafe mode), as will be described in the following paragraphs.

In the failsafe mode, the OS profile module 500 determines whether the prior usage ended properly (block 550). This is accomplished by using the USAGE_FLAG, which is stored in non-volatile memory. When the module 500 is started for the first time, USAGE_FLAG is set to zero. If USAGE_FLAG is modified to one and is not reset, indicating that the prior usage of computer system 100 did not end properly, the usage_duration is calculated using usage start_time and usage tally_time stored in non-volatile memory. Then usage_duration is stored as a record in non-volatile memory (block 555). On the other hand, if USAGE_FLAG is equal to zero, the module 500 retrieves and stores the system time and date as usage start_time, and USAGE_FLAG is set to one (block 560). At block 565, the periodic notification is setup using the operating system SetTimer( ) service. At block 570, a notification is received, and at block 575 it is determined whether a shutdown is detected. If a shutdown is not detected, then the time and date are retrieved and saved as usage tally_time in non-volatile memory (block 580). Blocks 570, 575, and 580 are continuously executed until a shutdown is detected, at which time blocks 525, 530, and 535 are executed as before, and the module ends.

The system usage duration provides the profile server 22 information on how long the user is on computer system 100.

Thus, as can be seen, the present invention provides numerous advantages, some of which include the ability to determine computer system usage profile, which is periodically provided to a server, and the ability to intelligently target content from the server to the computer system responsive to the computer system usage profile. The intelligent decisions include, for example, the amount of and periodicity of content to download, the price to charge third-party content providers for the content, and the like, in order to maximize the efficiency and effectiveness of the content.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of determining boot-up time of a computer system, comprising:
   retrieving a first time on the computer system;
   loading an operating system;
   retrieving a second time on the computer system when the operating system has loaded;
   determining a boot time in response to the first and second times; and
   determining an amount of content to transfer to the computer system based on the boot time.

2. The method of claim 1 further comprising transferring the boot time to a server.

3. The method of claim 2 further comprising transferring an amount of content responsive to the boot time.

4. The method of claim 2 further comprising adjusting the periodicity of the content to be transferred responsive to the boot time.

5. The method of claim 4 further comprising transferring the content from the server to the computer system.

6. The method of claim 1 further comprising storing each boot time as a record.

7. The method of claim 1, wherein retrieving a first time comprises retrieving the first time from the system timer of the computer system using a BIOS profile module.

8. The method of claim 1, wherein retrieving a second time comprises e second time from the system timer on the computer system once the operating oaded using an OS profile module, said OS profile module to be loaded once the stem has been loaded.

9. The method of claim 4, further comprising determining a boot the computer system, said boot frequency to be used in said adjusting the periodicity of the content to be transferred responsive to the boot time.

10. A computer program product, comprising:
    a computer usable medium having computer program code embodied therein to retrieve a first time on the computer system;
    computer readable program code to cause an operating system to load;
    computer readable program code to retrieve a second time on the computer system when the operating system has loaded;
    computer readable program code to determine a boot time in response to the first and second times; and
    computer readable program code to determine an amount of content to transfer to the computer system based on the boot time.

11. The computer program product of claim 10 further comprising computer readable program code to transfer the boot time to a server.

12. The computer program product of claim 11 further comprising computer readable program code to transfer an amount of content responsive to the boot time.

13. The computer program product of claim 11 further comprising computer readable program code to adjust the periodicity of the content to be transferred responsive to the boot time.

14. The computer program product of claim 13 further comprising computer readable program code to transfer the content from the server to the computer system.

15. A system, comprising:
    a computer including,
        a memory element having one or more instructions, and
        a processor coupled to the memory element, the processor, in response to the one or more instructions to,
        retrieve a first time on the computer,
        load an operating system,
        retrieve a second time on the computer when the operating system has loaded,
        determine a boot time in response to the first and second times; and
        transmit the boot time when a network connection is detected; and
    a server to receive the boot time, determine an amount of content to transfer to the computer based on the boot time, transmit said amount of content to the computer, and charge said amount from a source of the content responsive to the boot time.

16. The system of claim 15 wherein the server to adjust an amount of content to transfer responsive to the boot time.

17. The system of claim 15 wherein the processor to transmit a frequency of boots of the computer to the server such that the server adjusts a periodicity of the content that is transferred to the computer.

* * * * *